United States Patent [19]

Nakayama et al.

[11] Patent Number: 5,225,298
[45] Date of Patent: Jul. 6, 1993

[54] SEALED LEAD ACID BATTERY AND SEPARATOR FOR USE IN SEALED LEAD ACID BATTERY

[75] Inventors: Yasuhide Nakayama; Katsumi Kitagawa; Kenjiro Kishimoto; Junji Muto; Hironori Kitawaki; Shoji Sugiyama, all of Osaka, Japan

[73] Assignees: Yuasa Battery Co., Ltd.; Nippon Sheet Glass Co., Ltd., both of Osaka, Japan

[21] Appl. No.: 564,280

[22] Filed: Aug. 8, 1990

[51] Int. Cl.$^5$ .............................. H01M 2/16
[52] U.S. Cl. ..................................... 429/252
[58] Field of Search ......................... 429/252

[56] References Cited

FOREIGN PATENT DOCUMENTS

| | | |
|---|---|---|
| 59-71255 | 4/1984 | Japan . |
| 60-221954 | 11/1985 | Japan . |
| 61-269852 | 11/1986 | Japan . |
| 62-133669 | 6/1987 | Japan . |
| 62-136751 | 6/1987 | Japan . |
| 62-221954 | 9/1987 | Japan . |
| 63-143742 | 6/1988 | Japan . |
| 63-146348 | 6/1988 | Japan . |
| 63-152853 | 6/1988 | Japan . |

*Primary Examiner*—Mark L. Bell
*Attorney, Agent, or Firm*—Kanesaka and Takeuchi

[57] ABSTRACT

A separator in which a flowing rate of an electrolyte is less than 100 mm/hr and a sealed lead acid battery using the separator.

16 Claims, 1 Drawing Sheet

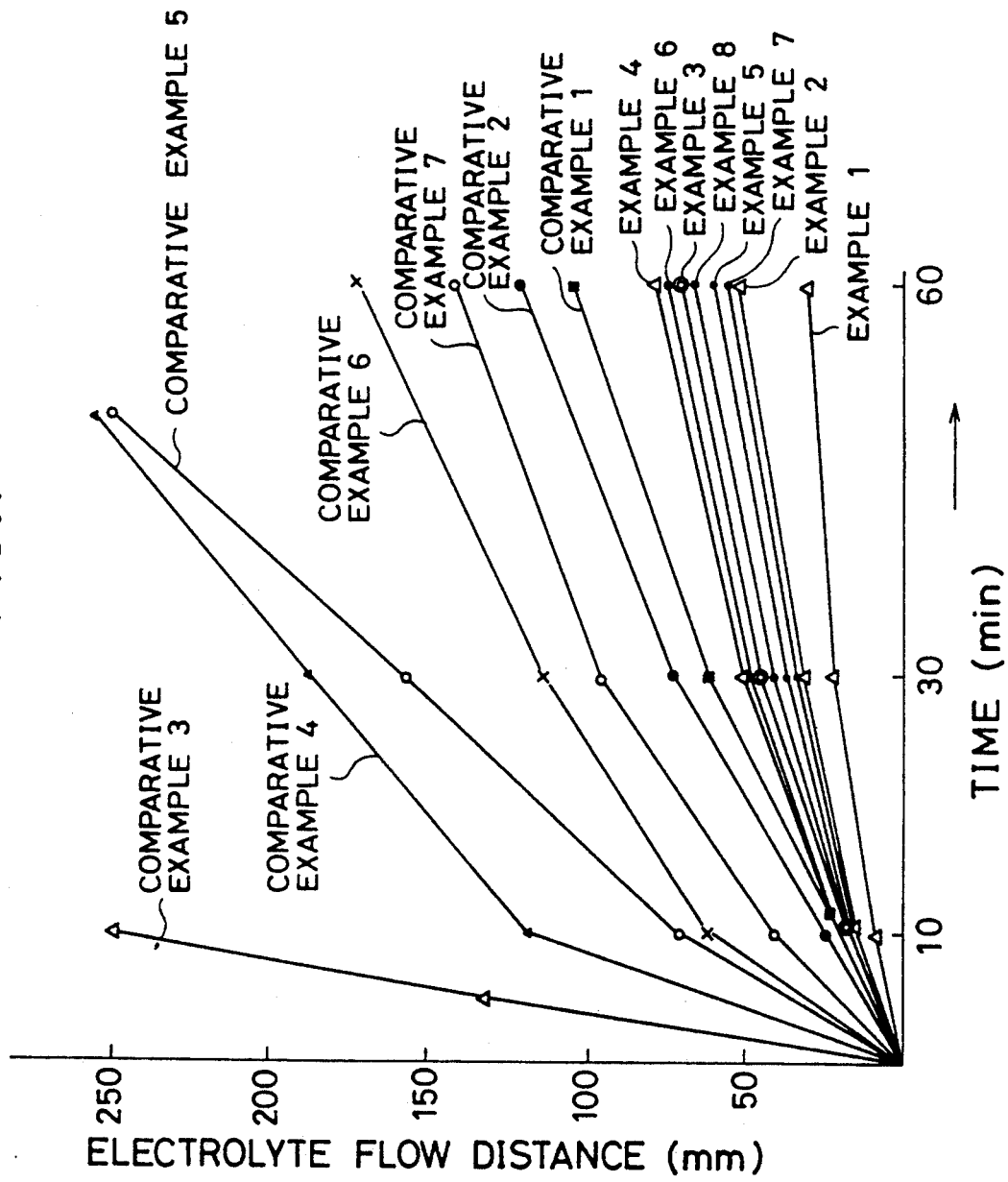

SEALED LEAD ACID BATTERY AND SEPARATOR FOR USE IN SEALED LEAD ACID BATTERY

FIELD OF THE INVENTION AND RELATED ART STATEMENT

The present invention concerns a sealed lead acid battery and a separator for use in a sealed lead acid battery and, in particular, it relates to a sealed lead acid battery with less stratification of an electrolyte and having a longer life and a reduced cost, as well as a separator for use in a sealed lead acid battery.

A sealed lead acid battery has a structure in which separators and plates are arranged in stack in sealed cells, and an electrolyte in the battery is retained without flowing in the pores the separators and both. The sealed lead acid battery has an advantageous feature of excellent liquid leakage proofness, requiring no water supplement and causing less self discharge. By the way, as described in Japanese Patent Publication Sho 63-27826, in a sealed lead acid battery of large capacity having separators and plates with specific, the concentration of an electrolyte retained in the porous structure of separators and plates shows difference with respect to the vertical direction by repeating charge and discharge. That is, there occurs a stratifying phenomenon that the concentration of the electrolyte is increased in the lower portion of the separator. Since the stratification tends to be caused mainly in the portion of the separator, it is required for improving the liquid-retaining effect of the separator, eliminating the difference of the liquid retainability between the upper and the lower portions of the separator or increasing the viscosity of the electrolyte by adding a fine silicic acid powder in order to prevent the stratification.

Heretofor, separators composed of glass fibers have mainly been used. For preventing the occurrence of the stratification, various improvements have been attempted for enhancing the liquid retainability of the separator or liquid possessing property.

For instance, Japanese Patent Laid Open sho. 62-133669 and Sho 62-136751 describe separators prepared by coating or mixing a powder, for example, of $SiO_2$, $TiO_2$ or rare earth element oxide. Japanese Patent Laid Open Sho 63-152853, Sho 60-221954 and Sho 61-269852 describe the use of silica or foamed perlite as the powder.

In addition, Japanese Patent Laid Open Sho 63-143742 and Sho 63-146348 disclose separators comprising glass fibers in the shape of hollow fine tubes. Further, Japanese Patent Laid Open Sho 64-10572 discloses a separator mainly composed of glass fibers in which the blending ratio of the fibers is specified.

However, although the silica powder can be added easily into the electrolyte, this is complicate in view of steps and, as a result, makes the resultant battery expensive. On the other hand, mixing of silica into the separator has not yet been used practically at present owing to the following reasons.

That is, since a separator can not be sheeted only from the silica powder it is prepared by admixing the silica powder to the material mainly composed of glass fibers. However, if the ratio of the silica powder is small, no sufficient effect for preventing the stratification can be obtained and, on the other hand, the sheet-making process becomes difficult if the ratio of the silica powder is excessive.

Thus, a separator for use in a sealed lead acid battery having excellent effect for preventing the stratification and easy to be manufactured has not yet been provided. Accordingly, the sealed lead acid batteries in the prior art cause stratification and have only short life.

OBJECT AND SUMMARY OF THE INVENTION

An object of the present invention is to overcome the foregoing problems in the prior art and provide a sealed lead acid battery having long life and of a reduced cost, as well as a separator for use in such a sealed lead acid battery.

Another object of the present invention is to provide a sealed lead acid battery showing stable and excellent battery performance in a sealed lead acid battery of small capacity, as well as a sealed lead acid battery of large capacity having a plate with a specific, and a separator for use in such a sealed lead acid battery.

The sealed lead acid battery according to the present invention has a feature of using a separator in which the flowing rate of an electrolyte is less than 100 mm/hr.

A separator for use in the sealed lead acid battery according to the present invention has a feature of using a separator in which the flowing rate of an electrolyte is less than 100 mm/hr.

A sealed lead acid battery using a separator in which the flowing rate of the electrolyte is less than 100 mm/hr shows excellent liquid retainability for the electrolyte and scarcely causes stratification of the electrolyte.

In specific embodiments of the present invention since the flowing rate of the electrolyte is as low as less than 100 mm/hr, the stratification preventive effect is high and the life time, in particular, cycle life performance can remarkably be improved.

That is, the present inventors have made various studies on various kinds of materials proposed so far as the separator materials, regarding the liquid-retaining materials for the electrolyte and the properties of the material used for the separator and, as a result, have obtained the following result of evaluation as shown in Table 1.

TABLE 1

| Liquid-retaining mechanism | | Liquid suction by capillary effect | Adsorption due to increased surface area | Chemisorption due to silanol group |
|---|---|---|---|---|
| separator material | Glass fiber | ⊚ | ○ | ○ |
| | Glass powder | x | ○ | Δ |
| | Dry silica powder | x | ○ | ○ |
| | Wet silica powder | x | ○ | ⊚ |
| | Other powder | x | ○ | x |
| | Chemical fiber | x | x | x |

⊚ very qood
○ good
Δ normal
x not good

From the result shown in Table 1, it has been found that separators having excellent liquid retainability can be obtained in a case of using glass fibers alone or in a case of using glass fibers and wet silica powder. Then, we have found that it is necessary, in the case of using the glass fibers alone, to employ glass fibers of such a fine diameter as sufficiently obtaining the capillary phenomenon and that there is an optimum blending amount of the silica powder both in view of the effect for improving the liquid retainability and the easiness in mixed sheet-forming process in a case of using the glass fiber and the wet silica powder. We have further found that there is a remarkable correlationship between the characteristics of separators and the life performance of a sealed lead acid battery using them and have accomplished the constitution for specific embodiment as shown in the present invention.

BRIEF DESCRIPTION OF THE DRAWINGS

FIG. 1 is a graph for illustrating the result of measurement for the electrolyte flowing rate in Examples 1–8 and Comparative Examples 1–7.

DESCRIPTION OF THE PREFERRED EMBODIMENTS

The present will be now be described more in details.

A separator used for a sealed lead acid battery in which the electrolyte flowing rate is less than 100 mm/hr, that is, the separator for use in the sealed lead acid battery according to the present invention has an electrolyte flowing rate of less than 100 mm/hr. If the electrolyte flowing rate is greater than 100 mm/hr, since the liquid retainability for the electrolyte is low, so-called stratification, in which the concentration of the electrolyte varies in the vertical direction of the separator, becomes remarkable by repeating charge and discharge. Although the lower electrolyte flowing rate is preferred in view of the prevention of the stratification, an excessively low rate would require a great amount of time for the liquid injection. Accordingly, in the separator for use in the sealed lead acid battery according to the present invention, the electrolyte flowing rate is from 5 to 100 mm/hr, preferably, from 20 to 70 mm/hr.

In the present invention, the flowing rate of the electrolyte for use in the sealed lead acid battery can be determined by the method as stated in the example to be described later.

The separator used for the sealed lead acid battery, as well as the separator as defined in the appended claim 10 in accordance with the present invention can be obtained easily.

The separator for use in the sealed lead acid battery in a first aspect comprises 100% glass fibers with an average fiber diameter of less than 0.65 μm. With the glass fibers of such a fine diameter, since a remarkably high liquid retainability can be obtained by the capillary effect, a separator for use in a sealed lead acid battery with the electrolyte flowing rate of less than 100 mm/hr can easily be attained. Since the cost of the separator is increased if the glass fiber diameter is too small, the average fiber diameter of the glass fibers is preferably more than 0.40 μm in the separator for use in the sealed lead acid battery in the appended claim 2, as well as in.

In the present invention, the average fiber diameter of the glass fibers is measured as described below.

100 glass fibers are drawn out of the separator at random and the diameter for each of the fibers is measured by an electron microscope and the average value obtained therefrom is defined as the average fine diameter.

The glass fibers for the separator used for the sealed lead acid battery in the first aspect are preferably alkali silicate containing glass.

When the alkali silicate-containing glass fibers are used, water-glass like material is formed on the surface of fibers in the sheet-making step of the production process and fibers are bonded to each other by the adhesion of the water-glass like material. In the present invention, alkali silicate-containing glass fibers of excellent acid resistance are suitably used among the alkali silicate-containing glass fibers. The extent of the acid resistance is desirably such that the weight reduction is less than 2% when measured in accordance with the method: JIS C-2202 in the state of glass fibers with an average fiber diameter of less than 1 μm. Further, as the composition of such glass fibers, there can be mentioned those mainly comprising, on the weight basis, 60 to 75% of $SiO_2$ and 8 to 20% of $R_2O$ (alkali metal oxide such as $Na_2O$ or $K_2O$) in which $SiO_2+R_2O$ is 75 to 90% and, further, comprising one or more of CaO, MgO, $B_2O_3$, $Al_2O_3$, ZnO and $Fe_2O_3$. Examples of preferred alkali silicate-containing glass are shown in the following Table 2.

TABLE 2

| Composition | Kind of glass | | |
|---|---|---|---|
| ingredient (wt %) | A | B | C |
| $SiO_2$ | 68.5 | 66.5 | 72.6 |
| CaO | 6.7 | 6.5 | 7.3 |
| MgO | 2.5 | 2.6 | 3.9 |
| $B_2O_3$ | 4.0 | 4.7 | — |
| $Na_2O$ | 14.1 | 10.1 | 13.0 |
| $K_2O$ | 1.4 | 1.5 | 0.9 |
| $Al_2O_3$ | 2.5 | 4.1 | 1.7 |
| ZnO | — | 3.6 | — |
| $Fe_2O_3$ | — | — | 0.1 |

On the other hand, the separator for use in the sealed lead acid battery in a second aspect comprises from 95 to 30% by weight, preferably, from 80 to 60% by weight of alkali-containing glass fibers with an average fiber diameter of less than 2 μm, and from 5 to 70% by weight and, preferably, from 20 to 40% by weight of a silica powder with a specific surface area of greater than 100 m²/g prepared by the wet process.

In the separator for use in the sealed lead acid battery and the separator of the diameter of the alkali-containing glass fibers is excessively large, the maximum pore size of the separator is increased to reduce the liquid retainability by the capillary effect to possibly hinder the effect for preventing the stratification of the electrolyte. Accordingly, the average fiber diameter is defined as less than 2 μm, preferably, less than 0.9 μm. On the other hand, since the cost of the separator is increased if the diameter of the glass fiber is too small, it is preferably defined as more than 0.4 μm, in particular, more than 0.6 μm. That is, the average fiber diameter of the alkali-containing glass fibers used in the appended claims 3 and 12 should be less than 2 μm, preferably from 0.4 to 0.9 μm and, more preferably, from 0.6 to 0.9 μm.

The alkali-containing glass fibers are preferably alkali silicate-containing glass fibers with the reasons as described above, that is, because the formation of the water glass-like material in the sheet-making step and the stickiness of the resultant water-glass-like material bonds the fibers to each other and/or fibers with the silica powder. In particular, alkali silicate-containing glass fibers having excellent acid resistance as shown in Table 2 are particularly preferred.

In the separator for use in the sealed lead acid battery of the appended claim 3 and the separator of the appended claim 12, the silica powder used is obtained by the wet process and has a specific surface area of greater than 100 m²/g. Some of silica powder may be obtained by a dry process, but the silica powder obtained by the dry process scarcely has pores at the inside of the particles and shows no effect for the improvement of the liquid retainability. On the other hand, the silica powder obtained by the wet process, has fine pores at the surface of the particles and also at the inside of the particles and, accordingly, it can improve the liquid retainability of the electrolyte and is also useful for the prevention of the stratification.

Further, in the second aspect, the specific surface area of such silica powder is defined as greater than 100 m²/g. The silica powder with such a large specific surface area contains many fine pores at the inside and the surface of the particles and is excellent for the effect of improving the electrolyte retainability and the effect of preventing the stratification. In the second aspect, the specific surface are of the silica powder used is, particularly preferably, more than 150 m²/g.

The production process for the silica powder mainly includes the dry process and the wet process. The wet process used in the present invention generally means such a process of neutralizing an aqueous solution of sodium silicate with an acid or alkali metal salt, and depositing silica through decomposing reaction. The reaction in the main production process is as shown below.

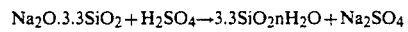

$$Na_2O.3.3SiO_2 + H_2SO_4 \rightarrow 3.3SiO_2nH_2O + Na_2SO_4$$

The reaction temperature is lower than 100° C.

By the way, the dry process means such a process of depositing silica by high temperature gas phase reaction. The reaction comprises a method of decomposing silicon tetrachloride and the reaction temperature is higher than 1,000° C.

The method of measuring the specific surface area for the silica powder in the present invention is a BET method (nitrogen adsorption method) which is most popular.

In the second aspect, the grain size of the silica powder should be from 0.05 to 20 μm, preferably, from 0.5 to 10 μm and, preferably, from 1 to 5 μm, because the mixing sheet making process becomes difficult if the grain size is less than 0.05 μm, while the liquid retainability is reduced to worsen the strength of the resultant separator if it exceeds 20 μm.

In the separator for use in the sealed lead acid battery of the second aspect if the ratio of the alkali-containing glass fibers is less than 30% by weight, that is, the ratio of the silica powder exceeds 70% by weight, the ratio of the silica powder is excessive to make the mixing sheet making step difficult. On the other hand, if the ratio of the alkali-containing glass fibers exceeds 95% by weight and thus the ratio of the silica powder is less than 5% by weight, the amount of the silica powder is insufficient failing to obtain a separator having as great effect for preventing the stratification in which the electrolyte flowing rate is less than 100 mm/hr and, accordingly, the life time of the sealed lead acid battery, in particular, cycle life performance is reduced. In the separator for use in the sealed lead acid battery in the second aspect, a preferred blending ratio is from 40 to 20% by weight of the silica powder based on 60 to 80% by weight of the alkali-containing glass fibers.

The separator for use in the sealed lead acid battery of the first and second aspect of the invention can be manufactured advantageously, for example, by the following methods.

That is, glass fibers of relatively short length prepared by FA method (flame attenuation method), centrifugal method or like other production method for short glass fibers are prepared, which are then beaten, cut and dispersed by a pulper.

Alternatively, the glass fibers may be cut short by an appropriate cutting means in the course of supplying them to a paper-making machine net.

The thus cut glass fibers (glass fibers together with the silica powder in the second aspect) are sheeted into a net-like material in the sheet-making step, in which pH in a beater and/or pH in a sheet-making vessel is preferably adjusted to less than about 3, for example, about 2.5. By applying beating and/or wet sheet-making step in such an acidic region, an adhesive layer of a water-glass like material is formed on the surface of the glass fibers. Subsequently, they are heated to a predetermined temperature, for example, at 80°-160° C. and the glass fibers can be bonded to each other by means of the water-glass-like material at the surface (glass fibers are also bonded with the silica powder in the appended claim 3). That is, in a case where the glass fibers constituting the separator comprise an alkali silicate-containing glass composition, the alkali ingredient and the silica ingredient in the glass fiber react with water for dispersion in the acidic region at a pH of about 2.5 to form a water-glass layer at the surface of the glass fibers, and the water-glass layer functions as the adhesive to firmly bond the glass fibers to each other.

In such a case if the length of the glass fibers is short and there are relatively less entanglement between the fibers to each other, they can be bonded sufficiently to obtain a separator of high strength. The thus wetprocessed sheeted glass fiber products are generally dried along a drum or a dryer into final products.

Upon sheet making, a dispersing agent may be used when dispersing fibers in water. Further, the liquid retainability of the separator can be improved by spraying a dialkyl sulfosuccinate and depositing it from 0.005 to 10% by weight based on the glass fibers to fibrous products obtained by the wet sheet making step, for example, fibrous products on a sheet made net, by means of the hydrophilic property of the dialkyl sulfosuccinate. Instead of spraying the dialkyl sulfosuccinate, it may be mixed in a dispersing water in the sheet making vessel.

There is no particular restriction for the thickness of the separator for use in the sealed lead acid battery according to the present invention and thickness is preferably greater than the average fiber length of glass fibers. A preferred range of the density of the separator is from 0.100 to 0.200 g/cm³. It is particularly preferred that the thickness is from 0.5 to 2.5 mm and the density is from 0.120 to 0.190 g/cm³.

The separator for use in the sealed lead acid battery according to the present invention having such a structure has remarkably high liquid retainability for the electrolyte, which is made equal in the vertical direction of the separator to prevent the stratification. Accordingly, the sealed lead acid battery using such a separator has an extremely long life performance.

Accordingly, a long life with stable and excellent battery performance can be attained in a sealed lead acid battery of a large capacity of a tall plate in height as well as in a sealed lead acid battery of a small capacity. It is apparent that such a long life can provide long life performance not only in the cycle life performance as tested but also in the application of equalized charge. In particular, the sealed lead acid batteries of the invention have the excellent effect as described above, require no addition of silica, etc. to the electrolyte, and enable to provide a sealed lead acid battery which is easy to be manufactured and extremely inexpensive.

The present invention will now be described referring to examples and comparative examples.

Methods of measuring the flowing rate of the electrolyte, the thickness and the average weight in examples and comparative examples are as shown below.

Flowing Rate of Electrolyte (1) A specimen is cut into 50 mm×250 mm size
(2) The specimen is set between two acrylic plates (70−80 mm (width)×500 mm (length)) opposed to each other by means of spacers at both ends such that the weight of the specimen is about 6.75 g (packed density: 0.16−0.21 g/cm$^3$).
(3) The specimen is immersed in water.
(4) Excess water is removed by a dehydrating machine (dry suction).
(5) The wet specimen is set to a measuring jig.
(6) A sulfuric acid solution with specific gravity of 1.3 is gently poured by means of a pipet from above the acrylic plates.

The sulfuric acid solution is charged to a depth of 100 mm from above the specimen and the height is made constant by optionally adding the solution.

The sulfuric acid solution is previously pigmented with a red ink or methyl orange.

(7) The falling distance at 5 min, 10 min, 30 min and 60 min after the electrolyte has completely been filled, is measured by a steel scale. The time is accurately measured by a stop watch.
(8) Measurement is conducted each by three times on every specimen.

Average weight (g/m$^2$) is a value obtained by dividing the weight of the specimen with the area of the specimen. Thickness (mm)

The thickness is measured in a state where the specimen is pressed along the thickness thereof under a load of 20 kg/dm$^2$ (JIS C-2202).

EXAMPLES 1-8, COMPARATIVE EXAMPLES 1-7

A separator for use in a battery was manufactured with materials blended as shown in Table 3 and the result of the measurements for the various properties are shown in Table 3 and FIG. 1.

Further, sealed lead acid batteries were assembled by using respective separators to examine the effect for preventing the stratification of the electrolyte and the results are also shown in Table 3.

The separator was manufactured by the method as described below.

Glass fibers were dispersed in water rendered acidic with sulfuric acid at pH 2.5-3.5 and, after mixing a silica powder, they were processed by a usual sheet-making process into a separator. The glass fibers with an average diameter of 0.5, 0.6, 0.7, 0.8 and 1.9 μm had Canadian freeness of 110, 160, 280, 380 and 580 cc respectively when they were measured according to JIS (Japanese Industry Standard) P 8121. In this case, a polymeric coagulant such as polyacryl amide or polyethylene imide may be used together, if necessary, for enhancing the fixing of the powder to improve the yield.

The wet silica powder used for the manufacture of the separator was prepared as shown below.

The reaction schem of the wet silica powder is as has been described above and the production process is as shown below.

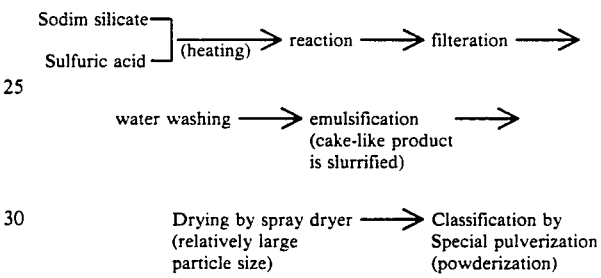

The sealed lead acid battery was assembled by stacking two positive plates each sized 40 mm (width)×70 mm (height)×3.3 mm (thickness) and negative plates each sized 40 mm (with)×70 mm (height) and 2.0 mm (thickness) by means of a predetermined separator under a pressure of 20 kg/dm$^2$, in which H$_2$SO$_4$ width specific gravity of 1.30 was poured by 43 cc per cell and the capacity per cell was 5 Ah/20 hr.

The thus assembled battery was subjected to a cycle life performance test by applying "discharge at 1.4 A for 3 hr and charge at 1.02 A for 5 hr" as one cycle. The time when the capacity of the battery was reduced to less than 4.2 Ah (1.4 A×3 h) was defined as the life.

In the course of the life test, each one cell of batteries under testing with 100 cycles was decomposed, and the specific gravity of the electrolyte above and below the separator and above and below the negative plate, as well as the amount of lead sulfate in the negative electrode active substance were measured.

According to Table 3, it is apparent that the sealed lead acid battery according to the present invention is excellent in the life performance, since the separator for use in the sealed lead acid battery according to the present invention has excellent effect of preventing the stratification.

TABLE 3

| | | | | Example | | | | | | | |
|---|---|---|---|---|---|---|---|---|---|---|---|
| | | | | 1 | 2 | 3 | 4 | 5 | 6 | 7 | 8 |
| Material Weight parts | Glass fiber *1 | Average fiber diameter (μm) | 0.5 | 100 | | | | | | | 20 |
| | | | 0.6 | | 100 | | | 50 | 27 | 36 | 60 |
| | | | 0.7 | | | | | 50 | | | |
| | | | 0.8 | | | 70 | 85 | | 63 | 54 | 20 |
| | | | 1.9 | | | | | | | | |
| | Average diameter of entire glass fiber (μm) | | | 0.5 | 0.6 | 0.8 | 0.8 | 0.64 | 0.71 | 0.69 | 0.59 |

TABLE 3-continued

|  |  |  |  |  |  |  |  |  |  |  |
|---|---|---|---|---|---|---|---|---|---|---|
|  | PET fiber (10 μm) *2 |  |  |  |  |  |  |  |  |  |
|  | Dry silica powder *3 |  |  |  |  |  |  |  |  |  |
|  | Wet silica powder *4 |  |  |  | 30 | 15 |  | 10 | 10 |  |
|  | TiSi₂ powder *5 |  |  |  |  |  |  |  |  |  |
|  | Glass powder *6 |  |  |  |  |  |  |  |  |  |
| Property | Average weight (g/m²) |  |  | 156 | 153 | 189 | 187 | 154 | 180 | 182 | 160 |
|  | Thickness (mm) |  |  | 1.08 | 1.04 | 1.11 | 1.11 | 1.09 | 1.10 | 1.10 | 1.11 |
|  | Flow distance after 60 min (mm) |  |  | 30 | 50 | 68 | 80 | 62 | 70 | 52 | 65 |
|  | Anti-stratification effect | Life time cycle |  | 670 | 550 | 520 | 495 | 530 | 510 | 520 | 560 |
|  |  | Specific weight of upper electrolyte at 100 cycle | upper | 1.295 | 1.291 | 1.290 | 1.291 | 1.292 | 1.291 | 1.290 | 1.294 |
|  |  |  | lower | 1.305 | 1.308 | 1.310 | 1.310 | 1.306 | 1.310 | 1.310 | 1.305 |
|  |  | Negative electrode lead sulfide at 100 cycles (%) | upper | 5.7 | 5.6 | 5.4 | 6.1 | 5.8 | 5.7 | 5.8 | 5.6 |
|  |  |  | lower | 6.1 | 6.8 | 6.0 | 7.9 | 6.2 | 6.7 | 6.5 | 6.1 |

|  |  |  |  | Comparative Example |||||||
|---|---|---|---|---|---|---|---|---|---|---|
|  |  |  |  | 1 | 2 | 3 | 4 | 5 | 6 | 7 |
| Material | Glass fiber *1 | Average fiber diameter (μm) | 0.5 |  |  |  |  |  |  |  |
|  |  |  | 0.6 |  |  |  |  |  |  |  |
|  |  |  | 0.7 | 100 |  |  |  |  |  |  |
|  |  |  | 0.8 |  | 100 |  | 70 | 50 | 70 | 70 |
|  |  |  | 1.9 |  |  |  |  | 50 |  |  |
| Weight parts | Average diameter of entire glass fiber (μm) |  |  | 0.7 | 0.8 | — | 0.8 | 0.97 | 0.8 | 0.8 |
|  | PET fiber (10 μm) *2 |  |  |  |  | 100 |  |  |  |  |
|  | Dry silica powder *3 |  |  |  |  |  |  |  | 30 |  |
|  | Wet silica powder *4 |  |  |  |  |  |  |  |  |  |
|  | TiSi₂ powder *5 |  |  |  |  |  | 30 |  |  |  |
|  | Glass powder *6 |  |  |  |  |  |  |  |  | 30 |
| Property | Average weight (g/m²) |  |  | 154 | 154 | 109 | 190 | 191 | 188 | 185 |
|  | Thickness (mm) |  |  | 1.10 | 1.10 | 1.09 | 1.12 | 1.11 | 1.10 | 1.10 |
|  | Flow distance after 60 min (mm) |  |  | 102 | 120 | 10 min. 250 | 50 min. 250 | 50 min. 250 | 170 | 140 |
|  | Anti-stratification effect | Life time cycle |  | 356 | 298 | 26 | 120 | 142 | 255 | 268 |
|  |  | Specific weight of upper electrolyte at 100 cycle | upper | 1.280 | 1.275 | 1.251 *7 | 1.262 | 1.265 | 1.271 | 1.270 |
|  |  |  | lower | 1.321 | 1.334 | 1.359 *7 | 1.346 | 1.343 | 1.329 | 1.330 |
|  |  | Negative electrode lead sulfide at 100 cycles (%) | upper | 9.3 | 9.9 | 21 *7 | 23 | 16 | 15 | 13 |
|  |  |  | lower | 12.1 | 14.5 | 68 *7 | 45 | 40 | 35 | 30 |

*1: Each composition core to A in Table 2
*2: Polyester fibers with average fiber diameter of 10 μm. and average fiber length of 10 mm
*3: Silica powder by dry method with specific surface are of 150 m²/g.
*4: Silica powder by wet method with specific surface are of 200 m²/g.
*5: TiSi₂ powder with average grain size of 2 μm
*6: Glass powder with average grain size of 10 μm
*7: Life time

What is claimed is:

1. A sealed lead acid battery, comprising a separator containing an electrolyte therein, said separator being substantially constituted only with glass fibers with an average fiber diameter of less than 0.65 micro-meter, said electrolyte having flowing rate in the separator less than 100 mm/hr, said flowing rate being measured by;
   (1) preparing a specimen by cutting the separator into a size of 50 mm×250 mm,
   (2) setting the specimen between two acrylic plates opposed to each other by means of spacers at both ends, each plate having a width of 70-80 mm and a length of 500 mm, said specimen having weight of about 6.75 g with packed density of 0.16-0.21 g/cm³,
   (3) immersing the specimen in water,
   (4) removing excess water by a dehydrating machine,
   (5) setting the wet specimen to a measuring jig,
   (6) gently pouring a sulfuric acid solution with specific gravity of 1.3 above the acrylic plates, wherein the sulfuric acid solution is previously pigmented and is charged to a depth of 100 mm from above the specimen and a height is made constant by optionally adding the solution, and
   (7) measuring a falling distance at 60 min by a scale after the electrolyte has completely been filled.

2. A sealed lead acid battery as defined in claim 1, wherein the density of the separator is between 0.164 and 0.170.

3. A sealed lead acid battery, comprising a separator containing an electrolyte therein, said separator being substantially constituted with 95 to 30% by weight of alkali-containing glass fibers with an average fiber diameter of less than 2 micro-meters and 5 to 70% by weight of a silica powder, said electrolyte having flowing rate in the separator less than 100 mm/hr, said flowing rate being measured by;
   (1) preparing a specimen by cutting the separator into a size of 50 mm×250 mm,
   (2) setting the specimen between two acrylic plates opposed to each other by means of spacers at both ends, each plate having a width of 70-80 mm and a length of 500 mm, said specimen having weight of about 6.75 g with packed density of 0.16–0.21 g/cm$^3$,
(3) immersing the specimen in water,
(4) removing excess water by a dehydrating machine,
(5) setting the wet specimen to a measuring jig,
(6) gently pouring a sulfuric acid solution with specific gravity of 1.3 above the acrylic plates, wherein the sulfuric acid solution is previously pigmented and is charged to a depth of 100 mm from above the specimen and a height is made constant by optionally adding the solution, and
(7) measuring a falling distance at 60 min by a scale after the electrolyte has completely been filled.

4. A sealed lead acid battery as defined in claim 3, wherein the diameter of the glass fibers is from 0.4 to 0.9 μm.

5. A sealed lead acid battery as defined in claim 3, wherein the diameter of the glass fibers is from 0.4 to 0.9 μm and the grain size of the silica powder is from 0.05 to 20 μm.

6. A sealed lead acid battery as defined in claim 3, wherein the specific surface area of the silica powder is greater than 100 m$^2$/g.

7. A sealed lead acid battery as defined in claim 3, wherein the silica powder is prepared by a wet process.

8. A sealed lead acid battery as defined in claim 7, wherein the specific surface area of the silica powder is greater than 100 m$^2$/g.

9. A separator for use in a sealed lead acid battery, containing an electrolyte therein, said separator being substantially constituted only with glass fibers with an average fiber diameter of less than 0.65 micro-meter, said electrolyte having flowing rate in the separator less than 100 mm/hr, said flowing rate being measured by;
(1) preparing a specimen by cutting the separator into a size of 50 mm×250 mm,
(2) setting the specimen between two acrylic plates opposed to each other by means of spacers at both ends, each plate having a width of 70–80 mm and a length of 500 mm, said specimen having weight of about 6.75 g with packed density of 0.16–0.21 g/cm$^3$,
(3) immersing the specimen in water,
(4) removing excess water by a dehydrating machine,
(5) setting the wet specimen to a measuring jig,
(6) gently pouring a sulfuric acid solution with specific gravity of 1.3 above the acrylic plates, wherein the sulfuric acid solution is previously pigmented and is charged to a depth of 100 mm from above the specimen and a height is made constant by optionally adding the solution, and
(7) measuring a falling distance at 60 min by a scale after the electrolyte has completely been filled.

10. A separator for use in a sealed lead acid battery as defined in claim 9, wherein the density of the separator is between 0.164 and 0.170.

11. A separator for use in a sealed lead acid battery, containing an electrolyte therein, said separator being substantially constituted with 95 to 30% by weight of alkali-containing glass fibers with an average fiber diameter of less than 2 micro-meters and 5 to 70% by weight of a silica powder, said electrolyte having flowing rate in the separator less than 100 mm/hr, said flowing rate being measured by;
(1) preparing a specimen by cutting the separator into a size of 50 mm×250 mm,
(2) setting the specimen between two acrylic plates opposed to each other by means of spacers at both ends, each plate having a width of 70–80 mm and a length of 500 mm, said specimen having weight of about 6.75 g with packed density of 0.16–0.21 g/cm$^3$,
(3) immersing the specimen in water,
(4) removing excess water by a dehydrating machine,
(5) setting the wet specimen to a measuring jig,
(6) gently pouring a sulfuric acid solution with specific gravity of 1.3 above the acrylic plates, wherein the sulfuric acid solution is previously pigmented and is charged to a depth of 100 mm from above the specimen and a height is made constant by optionally adding the solution, and
(7) measuring a falling distance at 60 min by a scale after the electrolyte has completely been filled.

12. A separator for use in a sealed lead acid battery as defined in claim 11, wherein the diameter of the glass fibers is from 0.4 to 0.9 μm.

13. A separator for use in a sealed lead acid battery as defined in claim 11, wherein the diameter of the glass fibers is from 0.4 to 0.9 μm and the grain size of the silica powder is from 0.05 to 20 μm.

14. A separator for use in a sealed lead acid battery as defined in claim 11, wherein the specific surface area of the silica powder is greater than 100 m$^2$/g.

15. A separator for use in a sealed lead acid battery as defined in claim 11, wherein the silica powder is prepared by a wet process.

16. A separator for use in a sealed lead acid battery as defined in claim 15, wherein the specific surface area of the silica powder is greater than 100 m$^2$/g.

* * * * *